US010367891B2

(12) United States Patent
Dhanabalan et al.

(10) Patent No.: US 10,367,891 B2
(45) Date of Patent: Jul. 30, 2019

(54) SYSTEM AND METHOD FOR IMPROVING EFFICIENCY OF SSL/TLS CONNECTIONS

(71) Applicant: Citrix Systems, Inc., Fort Lauderdale, FL (US)

(72) Inventors: Praveen Raja Dhanabalan, Tamil Nadu (IN); Chaitra Maraliga Ramaiah, Karnataka (IN); Akshata Bhat, Mangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 563 days.

(21) Appl. No.: 14/867,792

(22) Filed: Sep. 28, 2015

(65) Prior Publication Data

US 2017/0093984 A1 Mar. 30, 2017

(51) Int. Cl.
*H04L 29/06* (2006.01)
*H04L 29/08* (2006.01)

(52) U.S. Cl.
CPC ........ *H04L 67/141* (2013.01); *H04L 63/0428* (2013.01); *H04L 63/166* (2013.01);
(Continued)

(58) Field of Classification Search
CPC ..... H04L 67/141; H04L 69/326; H04L 67/10; H04L 63/0428; H04L 63/166
(Continued)

(56) References Cited

U.S. PATENT DOCUMENTS

2007/0035407 A1* 2/2007 Capowski ............ G08B 17/00
340/679
2009/0083538 A1* 3/2009 Merugu ............ H04L 63/0281
713/153
(Continued)

OTHER PUBLICATIONS

Dierks, T. et al.; "The Transport Layer Security (TLS) Protocol, Version 1.2"; Network Working Group, Request for Comments 5246; Aug. 2008; 104 pages; The Internet Society.
(Continued)

*Primary Examiner* — El Hadji M Sall
(74) *Attorney, Agent, or Firm* — Allen, Dyer, Doppelt + Gilchrist, PA

(57) ABSTRACT

A system for optimizing network traffic is described. The system includes a plurality of appliances, each having an SSL session exchange module. An appliance in active state is called a primary appliance, and one or more appliances in inactive state are called secondary appliances. An appliance of a cluster of appliances comprises a secure session exchange module and one or more network interfaces configured to facilitate a first secure session between a client device and the appliance and a second secure session between the appliance and a server. The secure session exchange module in a primary appliance is configured to provide a message for sending to one or more secondary appliances. The message indicates that the appliance is acting as a primary instance for a server. The secure session exchange module in the primary appliance is also configured to acquire at least one session-related parameter through a
(Continued)

handshake procedure for a secure layer with the server. A network interface of the one or more network interfaces is further configured to send the at least one session-related parameter to the one or more secondary appliances. The one or more secondary appliances are configured to reuse one or more sessions based on the acquired session-related parameter.

23 Claims, 12 Drawing Sheets

(52) U.S. Cl.
CPC ............ *H04L 67/10* (2013.01); *H04L 69/326* (2013.01); *H04L 63/0281* (2013.01)

(58) Field of Classification Search
USPC ......................................... 709/227, 217, 200
See application file for complete search history.

(56) References Cited

U.S. PATENT DOCUMENTS

2014/0304409 A1* 10/2014 Kamath .............. H04L 67/1036
    709/225
2015/0341428 A1* 11/2015 Chauhan ................ H04L 69/16
    709/203

OTHER PUBLICATIONS

Freier, A. et al.; "The Secure Sockets Layer (SSL) Protocol Version 3.0"; Internet Engineering Task Force, Request for Comments 6101; Aug. 2011; 67 pages; The Internet Society.
Salowey, J. et al.; "Transport Layer Security (TLS) Session Resumption without Server-Side State"; Network Working Group, Request for Comments 5077; Jan. 2008; 20 pages; The Internet Society.

* cited by examiner

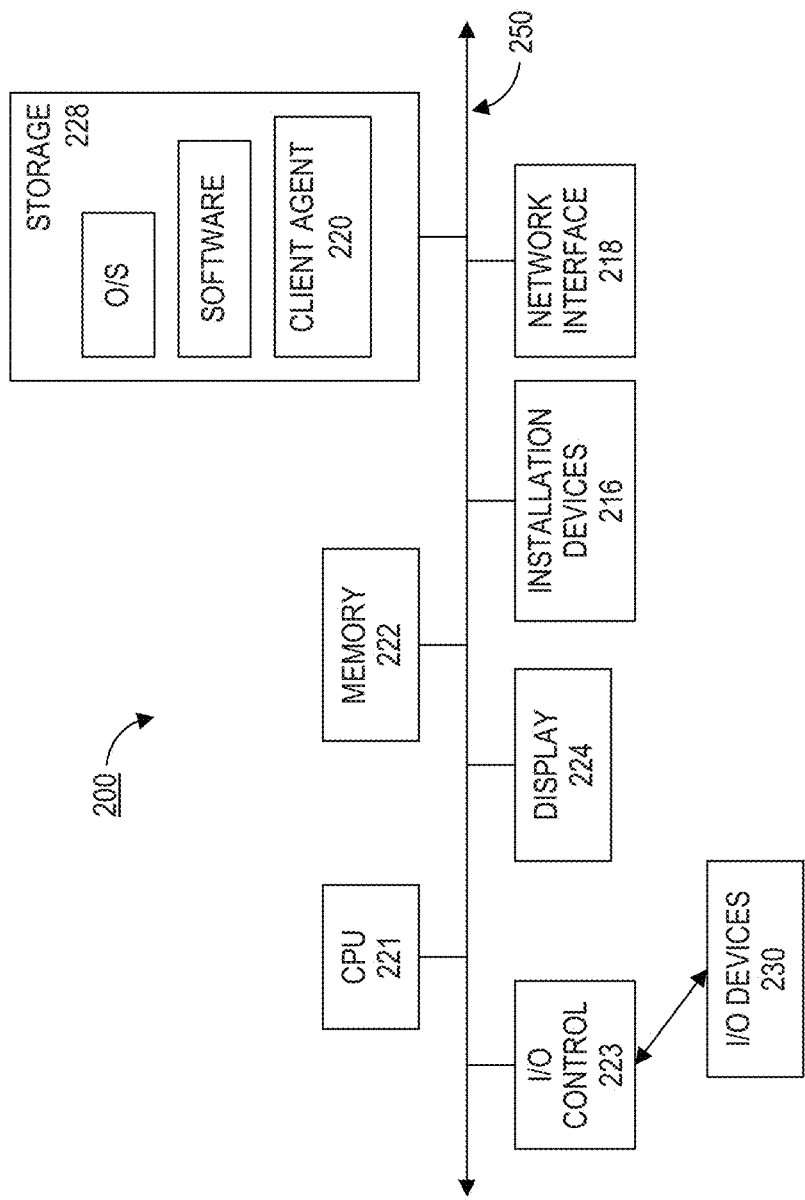

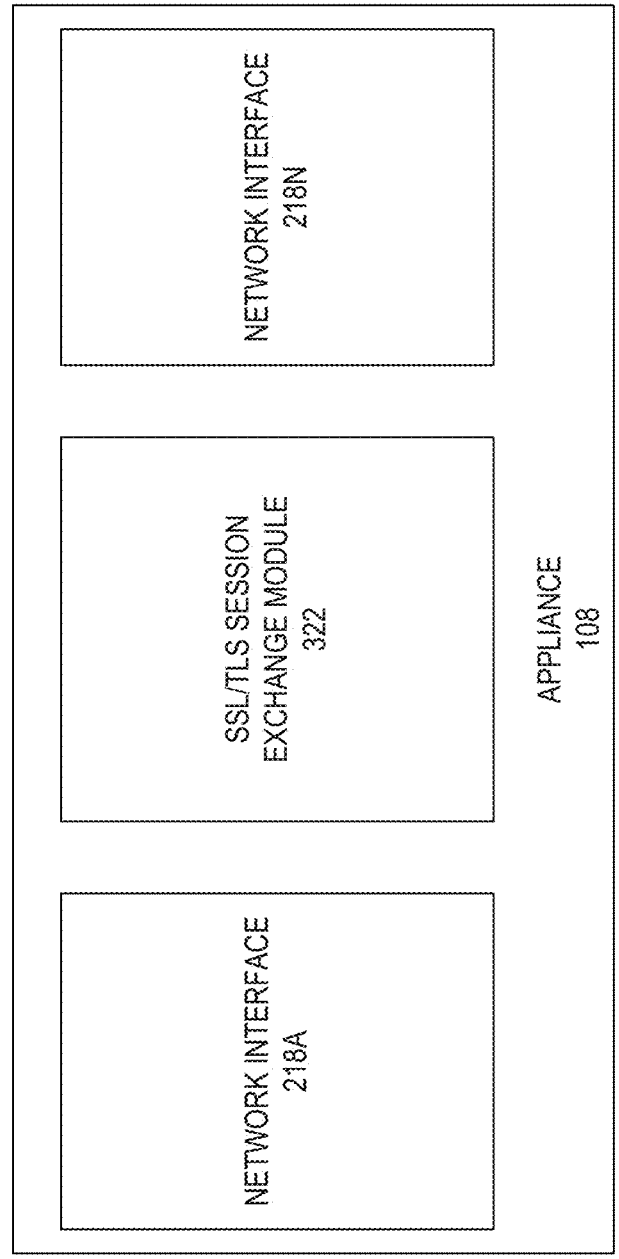

1000B

| | INSTANCE ID | 720 |
|---|---|---|
| 1010 | | |
| 1020 | SERVER ID | 122.145.123.852 |
| 1050 | SESSION-RELATED PARAMETER | IF SESSION IDENTIFIER 1051 | session identifier, session id length, chosen ciphersuite, chosen compression, start time, max fragment length, the master key, and other related flags and details |
| | | IF SESSION TICKET 1052 | the ticket, ticket length and the ticket lifetime |
| 1060 | DONE FLAG (e.g., Y/N) | Y |

FIG. 10B

SYSTEM AND METHOD FOR IMPROVING EFFICIENCY OF SSL/TLS CONNECTIONS

BACKGROUND

A middlebox is a network appliance that manipulates Internet traffic by optimizing data flow across the network. Middleboxes can be configured as wide area network ("WAN") optimizers and can be deployed in pairs across two geographically separated locations to optimize data traffic between the two middleboxes. Middleboxes can be connected through a single link or multiple links such as a leased line link and a broadband link. Middleboxes, which may be called WAN optimizers, can work as a pair of devices with primary job of optimizing the network traffic, providing better user experience.

For high availability networks, it is common to establish secure connections between two end point entities, for example between a client device and a web server. One or more middleboxes can be deployed between the two end point entities. Middleboxes can proxy one or more secure connections by monitoring secure connections on a first link between one end point entity and a middlebox and forming a new secure connection between the middlebox and the other end point entity based on the first link.

Middleboxes also act as Secure Sockets Layer (SSL) proxy appliances such that they can proxy SSL connections between the two end point entities. For example, by proxying an SSL connection at a middlebox that is located between a client device and a web server, two SSL sessions are formed. One session is an SSL connection, herein after SSL1, which is a trusted connection between the client device and the middlebox. This connection is trusted as an administrator of the middlebox would typically install a domain-trusted certificate and private keys on the middlebox to proxy the connection. The other session is another SSL connection, herein after SSL2, which is a trusted connection between the middlebox and the web server with an actual security certificate.

In a typical SSL/Transport Layer Security (TLS) connection between a client and a server, a single web session to a server can create multiple SSL/TLS connections to the server. Also when a web page gets refreshed, multiple secure connections are created to the same server. In the environment where multiple SSL/TLS connections to the server are proxied by a cluster of middleboxes, each of the connections can be proxied by a different middlebox from the cluster. Based on current technology, each of the middleboxes in the cluster would have to establish a full SSL handshake with the server to obtain certificates and to compute necessary keys for establishing a secure connection. This task is very high CPU intensive and might involve an additional Round Trip Time (RTT) and additional data to fetch the certificate chain.

SUMMARY

In some aspects, a system for optimizing network traffic is described. The system includes a plurality of appliances, each having an SSL session exchange module. An appliance in active state is called a primary appliance, and one or more appliances in inactive state are called secondary appliances. An appliance of a cluster of appliances comprises a secure session exchange module and one or more network interfaces configured to facilitate a first secure session between a client device and the appliance and a second secure session between the appliance and a server. The secure session exchange module is configured to provide a message for sending to one or more secondary appliances of the cluster of appliances. The message indicates that the appliance is acting as a primary instance for the server. The secure session exchange module is also configured to acquire at least one session-related parameter through a handshake procedure for a secure layer with the server. A network interface of the one or more network interfaces is further configured to send the at least one session-related parameter to the secondary appliances. The secondary appliances use the at least one session-related parameter in order to reuse one or more sessions connected to the server.

In another aspect, the system comprises at least one secondary appliance. The at least one secondary appliance comprises a secure session exchange module and one or more network interfaces configured to facilitate a first secure session between a client device and the appliance and a second secure session between the appliance and a server. A network interface of the one or more network interfaces is configured to receive a secure connection request to the server. The secure session exchange module is configured to acquire a message from the primary appliance. The message indicates that the primary appliance is acting as a primary instance for a server. The secure session exchange module is also configured to determine whether a valid primary instance for the server exists. It is considered to be a valid primary instance for the server when there is a primary instance for the server within timeout expiry whose timeout value is specified in the message acquired from the primary appliance. The secondary appliance is also configured to request the other appliance at least one session-related parameter, based on determination of existence of the valid primary instance for the server. The secondary appliance is further configured to use one or more sessions to the server based on the at least one session-related parameter acquired from the primary appliance.

In another aspect, a method performed by an appliance having a secure session exchange module is described. The method includes providing a message for sending to one or more other appliances of the cluster of appliances. The message indicates that the appliance is acting as a primary instance for a server. The method also includes acquiring at least one session-related parameter through a handshake procedure for a secure layer with the server, and sending the at least one session-related parameter to one or more other appliances. In yet another aspect, non-transitory computer readable storage medium is described. The storage medium stores a set of instructions that are executable by at least one processor of an appliance to cause the appliance to perform a method for optimizing network traffic. The method can include providing a message for sending to one or more other appliances, the message indicating that the appliance is acting as a primary instance for a server, acquiring at least one session-related parameter through a handshake procedure for a secure layer with the server, and sending the at least one session-related parameter to one or more other appliances.

In another aspect, a method performed by an appliance having a secure session exchange module is described. The method includes acquiring a message from another appliance, the message indicating that the other appliance is acting as a primary instance for a server, acquiring a secure connection request to the server, determining whether a valid primary instance for the server exists, requesting the other appliance at least one session-related parameter, based on determination of existence of the valid primary instance for the server, and using a session to the server based on at least one session-related parameter acquired from the other appliance. It is considered to be a valid primary instance for the server when there is a primary instance for the server within timeout expiry whose timeout value is specified in the message acquired from the primary appliance.

In yet another aspect, non-transitory computer readable storage medium is described. The storage medium stores a set of instructions that are executable by at least one processor of an appliance to cause the appliance to perform a method for optimizing network traffic. The method can include acquiring a message from another appliance, the message indicating that the other appliance is acting as a primary instance for a server, acquiring a secure connection request to the server, determining whether a valid primary instance for the server, requesting the other appliance at least one session-related parameter, based on determination of existence of the valid primary instance for the server, and using a session to the server based on at least one session-related acquired from the other appliance.

BRIEF DESCRIPTION OF THE DRAWINGS

Reference will now be made to the accompanying drawings showing example embodiments of this disclosure. In the drawings:

FIGS. 2A-2B are block diagrams of an exemplary computing device, consistent with embodiments of the present disclosure.

FIG. 3 is a block diagram of an exemplary appliance illustrated in FIG. 1, consistent with embodiments of the present disclosure.

FIG. 10A-10B are exemplary information sent by an appliance, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide improved efficiency of SSL/TLS connections in a network. The efficient SSL/TLS connections can be realized by proxing an SSL/TLS connection between one middlebox device and a server, e.g., a web server, via SSL/TLS full handshake procedure, and sharing at least one session-related parameter with one or more other middleboxes. The at least one session-related parameter can be used when the one or more other middleboxes reuse one or more SSL/TLS sessions to the server. This will improve efficiency of SSL/TLS connections without necessarily performing, by each of a plurality of middleboxes, SSL/TLS full handshake procedure in order to acquire at least one session-related parameter. Moreover, the embodiments described herein can be less CPU intensive and can use less Round Trip Time (RTT) and less data to fetch the certificate chain in computing session keys.

Figure 1:
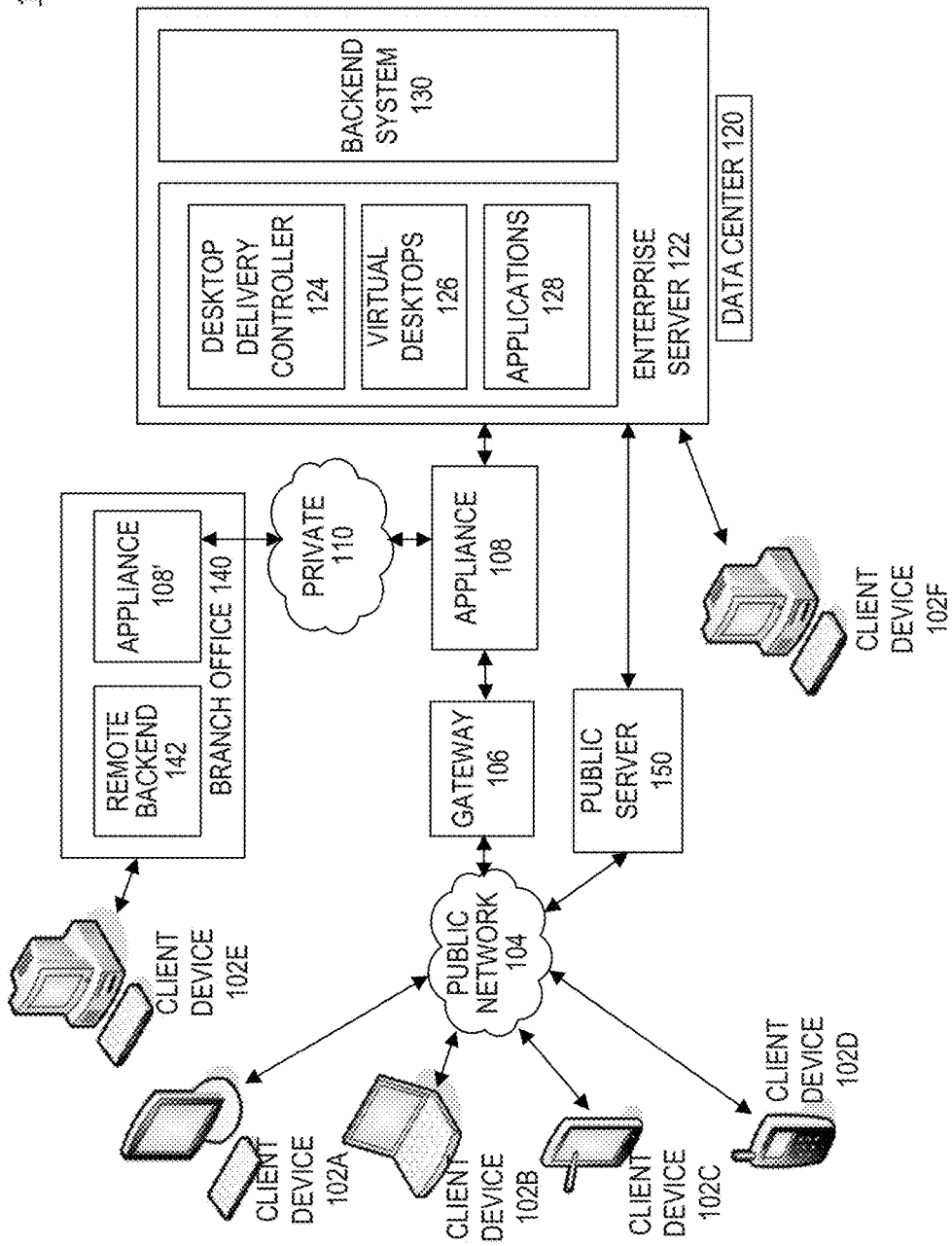
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, public network 104, gateway 106, an appliance 108, a private network 110, a data center 120, a branch office 140, and a public server 150.

One or more client devices 102 are devices that can acquire remote services from data center 120 through various means. Client devices 102 can communicate with data center 120 either directly (e.g., client device 102F) or indirectly through public network 104 (e.g., client devices 102A-D) or private network 110 (e.g., client device 102E). When client device 102 communicates through public network 104 or private network 110, a communication link can be established. For example, a link can be established by public network 104, gateway 106, and appliance 108, thereby providing a client device (e.g. client devices 102A-D) access to data center 120. A link can also be established by branch office 140 including appliance 108', private network 110, and appliance 108, thereby providing a client device (e.g. client device 102E) access to data center 120. While client devices 102 are portrayed as a computer (e.g., client devices 102A, 102E, and 102F), a laptop (e.g., client device 102B), a tablet (e.g., client device 102C), and a mobile smart phone (e.g., client device 102D), it is appreciated that client device 102 could be any type of device (e.g., wearable or smart watch) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108 and/or data center 120 can understand and vice versa.

Appliance 108 is a device that optimizes wide area network (WAN) traffic by including, for example, a quality of service ("QoS") engine. In some embodiments, appliance 108 optimizes other types of network traffic, such as local area network (LAN) traffic, metropolitan area network (MAN) traffic, or wireless network traffic. Appliance 108 can optimize network traffic by, for example, scheduling data packets in an established communication link so that the data packets can be transmitted or dropped at a scheduled time and rate. In some embodiments, appliance 108 is a physical device, such as Citrix System's ByteMobile™, Netscaler™, or CloudBridge™. In some embodiments, appliance 108 can be a virtual appliance. In some embodiments, appliance can be a physical device having multiple instances of virtual machines (e.g., virtual Branch Repeater). A first appliance (e.g., appliance 108) can work in conjunction with or in cooperation with a second appliance (e.g., appliance 108') to optimize network traffic. For example, the first appliance can be located between the WAN and a corporate LAN (e.g., data center 120), while the second appliance can be located between branch office (e.g., branch office 140) and a WAN connection. In some embodiments, the functionality of gateway 106 and appliance 108 can be located in a single physical device. Moreover, in some embodiments, appliance 108 and gateway 106 can be part of the same device. Appliances 108 and 108' can be functionally the same or similar. Appliance 108 is further described below corresponding to FIG. 3.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., enterprise server 122) and a backend system 130. In some embodiments data center 120 can include gateway 106, one or more appliances 108, or a combination of both.

Enterprise server 122 is an entity represented by an IP address and can exist as a single entity or a member of a server farm. Enterprise server 122 can be a physical server or a virtual server. In some embodiments, enterprise server 122 can include a hardware layer, an operating system, and a hypervisor creating or managing one or more virtual machines. Enterprise server 122 provides one or more services to an endpoint. These services include providing one or more applications 128 to one or more endpoints (e.g., client devices 102A-F or branch office 140). For example, applications 128 can include Microsoft Windows™-based applications and computing resources.

Desktop delivery controller 124 is a device that enables delivery of services, such as virtual desktops 126 to client devices (e.g., client devices 102A-F or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with enterprise server 122. For example, backend system 130 can include Microsoft Active Directory™, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle™ backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the Wireless LAN (WLAN) having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102E can be located on-site to branch office 140 or can be located remotely from branch office 140.

Public server 150 is an entity represented by an IP address. Public server 150 can be a physical server or a virtual server. In some embodiments, public server 150 can include a hardware layer, an operating system, and a security agent issuing security-related parameters such as public keys, cipher certificates, session identifiers and session tickets, and managing one or more secure connections. Public server 150 can be accessed directly or indirectly by client devices 102A-F. Public server 150 provides one or more services to an endpoint. These services include one or more applications, such as web-browser applications, to one or more endpoints (e.g., client devices 102A-F, data center 120, or branch office 140). Public server 150 can provide secure connections using Internet security protocols, e.g., SSL/TLS protocols, for secure services to one or more endpoints (e.g., client devices 102A-F, data center 120, or branch office 140). The present application describes improved efficiency of SSL/TLS connections by proxying connections between a middlebox and another middlebox or public server 150. However, it is appreciated that the disclosed method can be applicable on any kind between two apparatuses to improve efficiency of SSL/TLS connections.

Appliances 108 and 108' and gateway 106 can be deployed as or executed on any type and form of specific computing device (e.g., such as the computing device of FIGS. 2A-2B) capable of communicating on any type and form of network described herein. Appliances 108 and 108' can be deployed individually or as a pair operatively connected together.

Figure 2B:
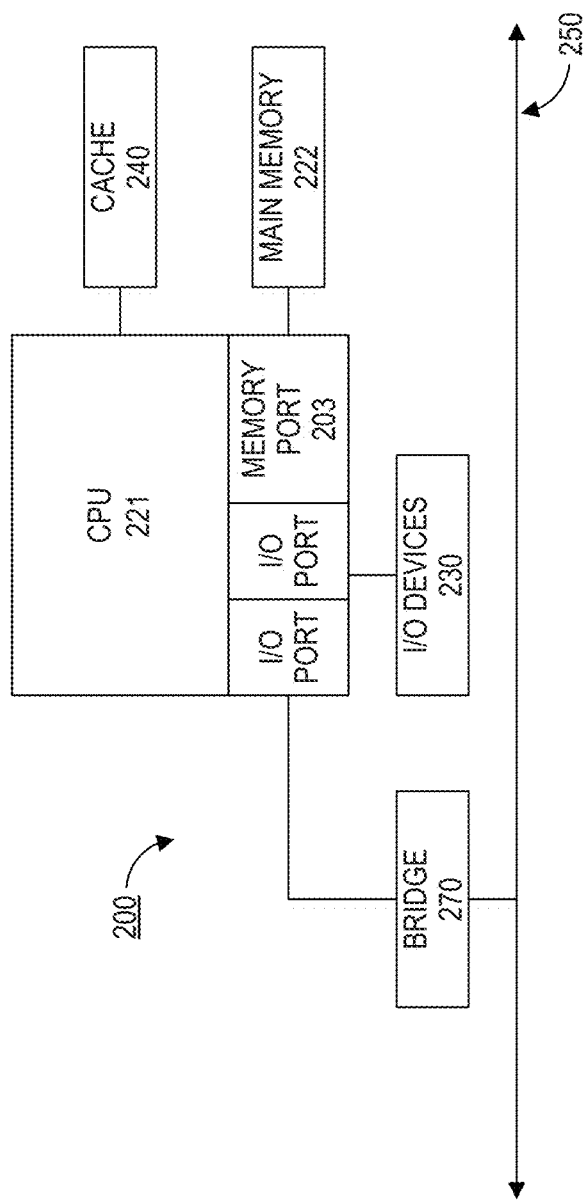

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with main memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a FireWire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of links including, but not limited to, standard telephone lines, LAN or WAN links (e.g., 802.11, T1, T3, 56 kb, X.25), broadband links (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

FIG. 3 is a block diagram of an exemplary appliance 108 (including 108A-108C illustrated in FIG. 5) and/or 108' illustrated in FIG. 1, consistent with embodiments of the present disclosure. Appliance 108 can include an SSL session exchange module 322 and one or more network interfaces 218A-N consistent with network interface 218 of FIG. 2A. Although FIG. 3 depicts network interfaces 218A-218N as two network interfaces, it is appreciated that interfaces 218A-218N can include any number of network interfaces.

SSL session exchange module 322 is a module, which is a packaged functional hardware unit designed for use with other components or a part of a program that performs a particular function of related functions. In some aspects, SSL session exchange module 322 can operate on two or more devices, e.g., client devices 102A-F, branch office 140, data center 120, and public server 150, functionally connected to provide efficient SSL/TLS connections. Each device having SSL session exchange module 322 can be configured as either a primary device or a secondary device. SSL session exchange module 322 can run in active mode on the primary and in passive mode on the secondary. Although depicted in FIG. 3 as SSL session exchange module 322, reference will be made to primary SSL session exchange module 322A (depicted in FIG. 9) that operates in appliance 108A (depicted in FIG. 5), secondary SSL session exchange module 322B (depicted in FIG. 9) that operates in appliance 108B (depicted in FIG. 5), and secondary SSL session exchange module 322C (depicted in FIG. 9) that operates in appliance 108C (depicted in FIG. 5).

Figure 4:
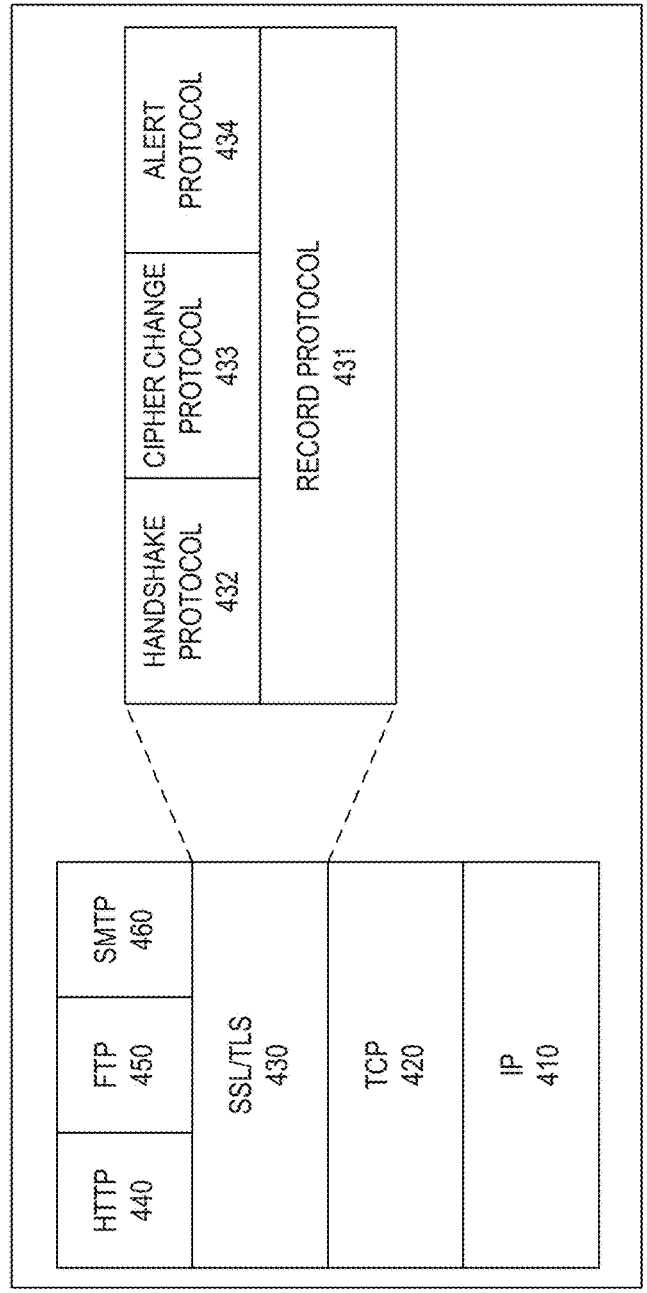
FIG. 4 is a block diagram of an exemplary protocol stack of appliance, consistent with embodiments of the present disclosure.

FIG. 4 is a block diagram of an exemplary protocol stack 400 of appliance 108 and/or 108', consistent with embodiments of the present disclosure. According to some embodiments, appliance 108 and/or 108' can be configured to have a security layer, e.g., SSL/TLS layer 430. The SSL/TLS layer 430 can include SSL session exchange module 322 (depicted in FIG. 3) and a secure socket Application Programming Interface (API) (not shown). The security layer, e.g., SSL/TLS layer 430 of FIG. 4, can use underlying layers for reliable communications. Such underlying layers can be provided by, e.g., Transport Control Protocol (TCP) layer 420 and Internet Protocol (IP) layer 410. Applications, such as web service applications, can use the secure socket API to encrypt communication with any remote application that communicates according to SSL/TLS protocol. Any standard Internet web browser on public server 150 can be accessed by secure web server applications using application protocols such as HyperText Transfer Protocol (HTTP) 440, File Transfer Protocol (FTP) 450, Simple Mail Transfer Protocol (SMTP) 460, etc. on top of SSL/TLS 430.

In some embodiments, SSL/TLS layer 430 can include a record protocol layer 431, a handshake protocol layer 432, cipher change protocol layer 433, and alert protocol layer 434, as referenced in Internet Engineering Task Force (IETF) Request For Comments (RFC) 6101. The record protocol layer 431 can receive uninterpreted data from higher layers e.g., application layer. The record protocol layer 431 is responsible for fragmenting uninterpreted data with fixed length and encrypting packets that were broken down with fixed-length compressing the data. The record protocol layer 431 is also responsible for adding SSL header in the packets.

The handshake protocol layer 432 that operates on top of the record protocol layer 431 can produce cryptographic parameters of session state. As an example, primary SSL session exchange module 322A that operates in application 108A can act as an SSL client, and public server 150 can act as an SSL server. When an SSL client and an SSL server first start communicating, the SSL client and the SSL server agree on a protocol version, select cryptographic algorithms, optionally authenticate each other, and use public key encryption techniques to generate shared secrets. These processes are performed in the handshake protocol, which can be summarized as follows: the SSL client sends a client hello message to which the SSL server must respond with a server hello message, or else a fatal error will occur and the connection will fail. The SSL client hello and SSL server hello are used to establish security enhancement capabilities between the SSL client and the SSL server. The client hello and server hello establish the following attributes: Protocol Version, Session ID, Cipher Suite, and Compression Method. Additionally, two random values are generated and exchanged: ClientHello.random and ServerHello.random.

The cipher change protocol layer 433 is to signal transitions in ciphering strategies between the SSL client and the SSL server. In other words, sending (from the SSL client to the SSL server or vice versa) a message to notify that subsequent records will be protected under just-negotiated CipherSpec and keys.

The alert protocol layer 434 supports alert messages to convey severity of a message and a description of an alert. An alert can include, for example, closure alerts and error alerts. Closure alerts are used to notify that a connection is ending in order to avoid a truncation attack. Error alerts are used to send an error message in the event of error detections. Upon transmission or receipt of a fatal alert message, both the SSL client and the SSL server immediately close a connection.

Figure 5:
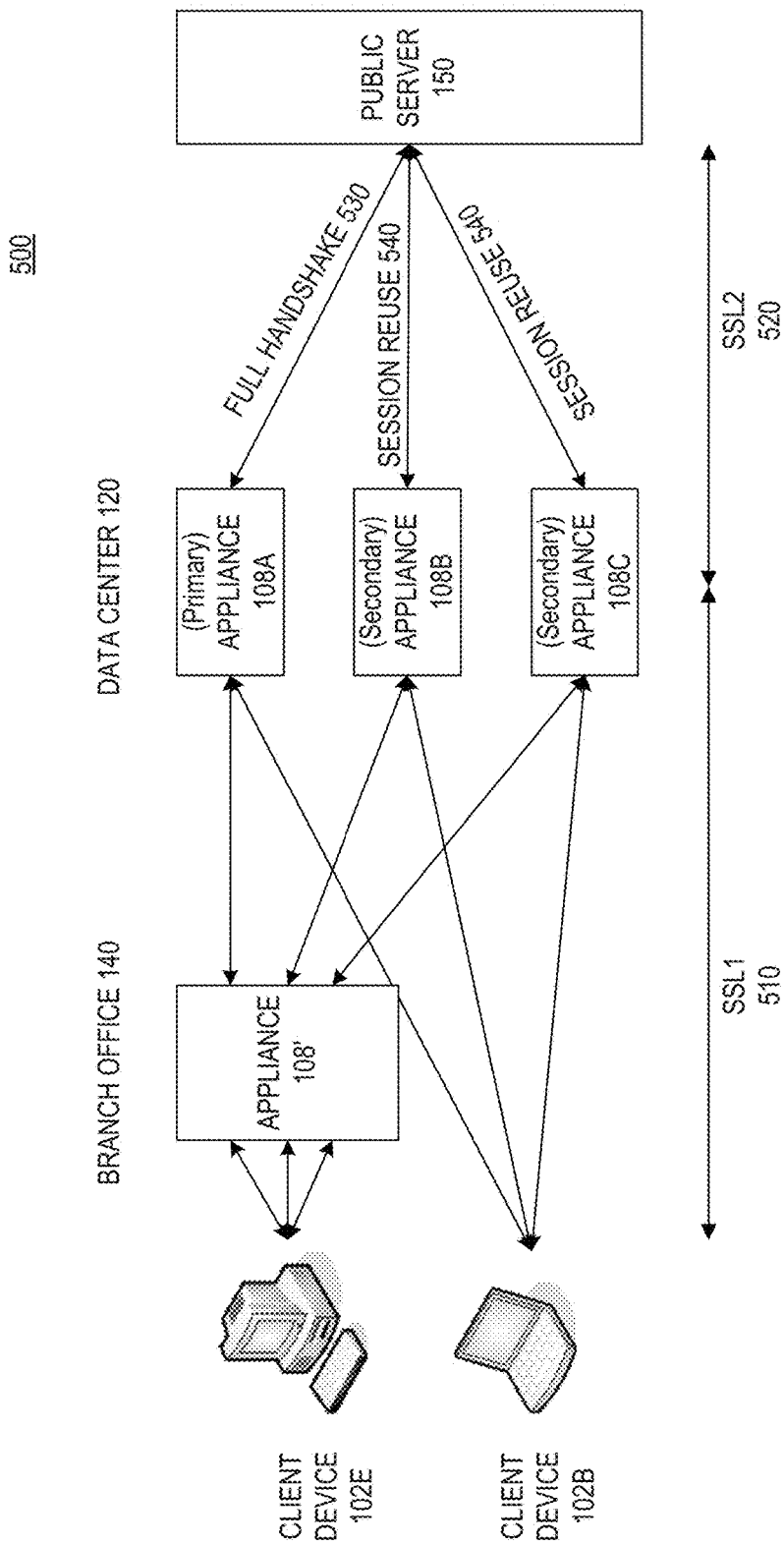
FIG. 5 is a block diagram of an exemplary network environment, consistent with embodiments of the present disclosure.

FIG. 5 is a block diagram of an exemplary network environment 500, consistent with embodiments of the present disclosure. It is appreciated that network environment 500 is a simplified illustration and that other components can be added in network environment 500 whenever necessary. Also, network environment 500 can be any type of network that communicates using packets. The network environment 500 can include a plurality of client devices 102 (e.g., 102B and 102E depicted in FIG. 5), appliance 108' coupled to branch office 140, a plurality of appliances 108 (e.g., 108A-108C depicted in FIG. 5) that may be located in or out of data center 120, and public server 150. Although a single appliance 108' is shown in branch office 140 in FIG. 5, it is appreciated that one or more appliances 108' can be located in a plurality of branch offices 140.

The network environment 500 can have a plurality of SSL/TLS connections at two or more stages between client device 102 and public server 150. As an example, there can be, at a first stage, an SSL/TLS connection between a client devices 102 (e.g., 102B) and appliances 108 (e.g., 108A-108C), the connection between which refers to SSL1 510. In some embodiments, SSL1 510 can also have a SSL/TLS connection between client device 102 (e.g., 102E) and appliance 108' in branch office 140, and another SSL/TLS connection between appliance 108' in branch office 140 and appliances 108 (e.g., 108A-108C). At a second stage, there can be another SSL/TLS connection between appliances 108 (e.g., 108A-108C) and public server 150, the connection between which refers to SSL2 520. The present application has focused the SSL2 520 connections at the second stage to improve efficiency of SSL/TLS connections through a cluster of SSl/TLS proxy appliances.

One or more client devices 102 can directly connect to appliance 108 (e.g., 108A-108C), or indirectly connect to appliance 108 (e.g., 108A-108C) via appliance 108' in branch office 140. For example, client device 102B is directly connected to appliances 108A-108C, and client device 102E is indirectly connected to appliances 108A-108C via appliance 108' in branch office 140.

Appliance 108A and 108B can operate in active state or passive state. As used herein, an appliance in an active state (represented as primary appliance 108A) is responsible for providing tuple information for sending to one or more other appliances, performing an SSL/TLS full handshake procedure 530 in order to acquire session-related parameters such as one or more session identifiers, one or more session tickets, or both. Primary appliance 108A also has responsibility to send or broadcast the acquired session-related parameters to all the secondary appliances, e.g., appliance 108B and 108C. Then, secondary appliances 108B and 108C can reuse one or more sessions 540 to the public server 150 based on the at least one acquired session-related parameter. In some embodiments, primary and secondary appliances 108A-C can be located in branch office 140.

According to some embodiments, appliances 108A-108C work in conjunction with one another to switch the responsibility of primary or secondary roles in the event that a primary appliance becomes inactive, and vice versa. In general, network environment 500 includes one primary appliance and one or more secondary appliances in the present application, in a cluster of appliances, during certain time period. In other words, the primary appliance is active, while the one or more secondary appliances are passive during the same time period.

Figure 6:
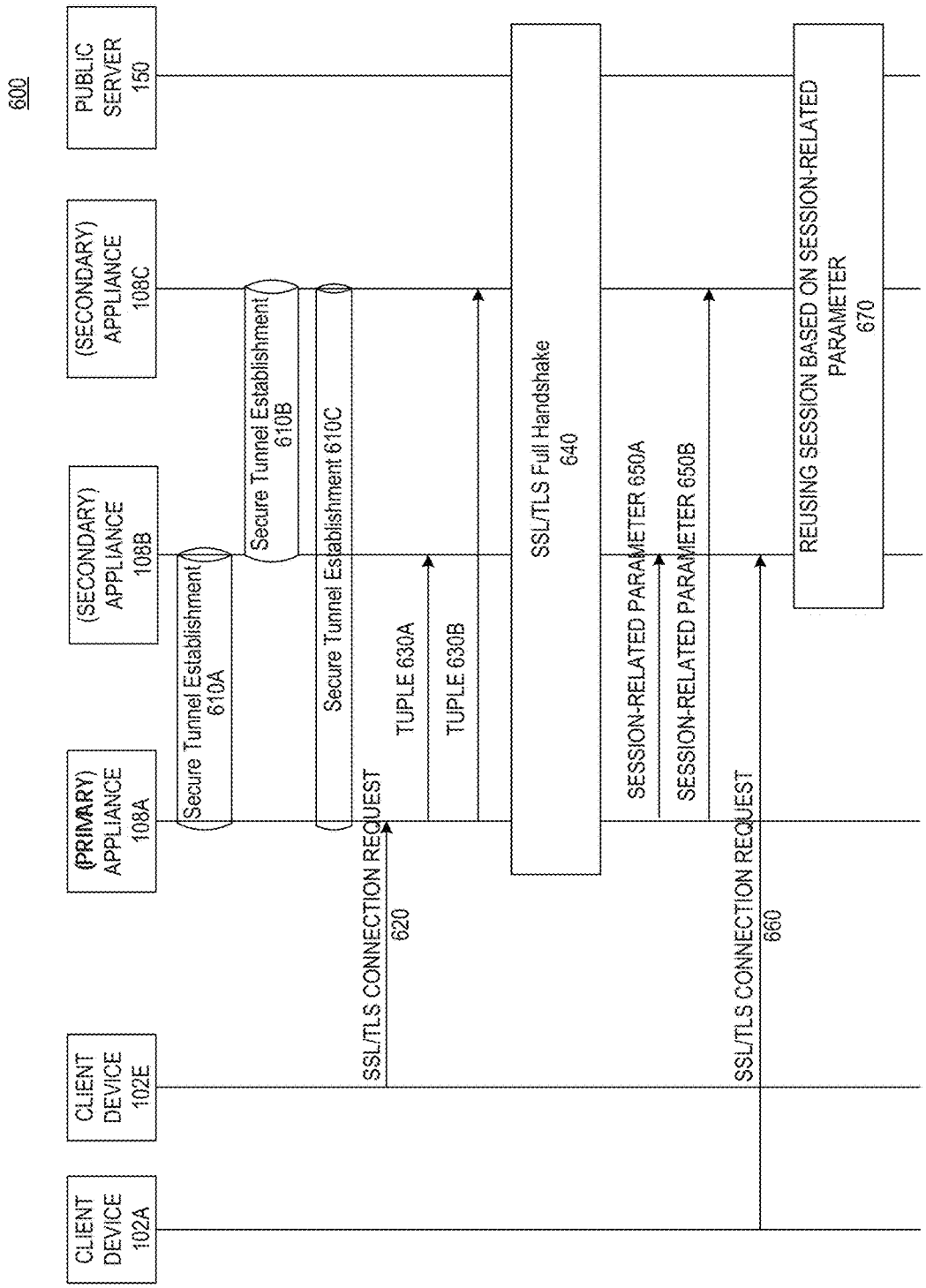
FIG. 6 is a flowchart representing an exemplary method of making efficient secure connections, consistent with embodiments of the present disclosure.

FIG. 6 is a flowchart representing an exemplary method 600 of making efficient secure connections, consistent with embodiments of the present disclosure. It will be readily appreciated that the illustrated procedure can be altered to delete steps or further include additional steps. While method 600 is described as being performed by a plurality of components, e.g., client devices 102A and 120E, primary appliance 108A, secondary appliances 108B and 108C, and a server (e.g., public server 150), it is appreciated that other components can be added or omitted and the method 600 can be performed by other devices alone or in combination with another appliance. Moreover, it is appreciated that primary appliance 108A has sent or broadcasted one or more messages to at least one secondary appliance (e.g., appliance 108B, 108C, or both).

As an initial start, an appliance performs secure tunnel establishment with the one or more other appliances. For example, as illustrated in FIG. 6, primary appliance 108A performs secure tunnel establishment with secondary appliance 108B at step 610A and secondary appliance 108C at step 610C. Secondary appliance 108B performs secure tunnel establishment with another secondary appliances 108C at step 610B. Secure tunnel can be established by either configuring a symmetrical key in each of the appliances (e.g., 108A-108C) in the cluster or by installing trusted certificates and its private keys. By configuring either the symmetrical key or the private keys, session-related parameters will be secured by encrypting data packets when transferred across the appliances (e.g., 108A-108C) in the network. Across the appliances (e.g., 108A-108C) the data packets are encrypted on one appliance and decrypted on another appliance.

At step 620, primary appliance 108A can acquire a new SSL/TLS connection request from client device 102E. The new SSL/TLS connection request can include server (e.g., public server 150) information such as a server identifier (ID), and a server IP address. In some embodiments, the server IP address can be the server ID.

Primary appliance 108A can provide a message, e.g., a tuple for sending to one or more secondary appliances in a cluster. Primary appliance 108A can also broadcast a tuple to all the secondary appliances in the cluster. As an example in FIG. 6, primary appliance 108A provides a tuple for sending to secondary appliance 108B at step 630A and to secondary appliance 108C at step 630B. In general, providing a tuple for sending to all or part of secondary appliances (e.g., 630A and/or 630B) can be performed before or after acquiring a new SSL/TLS connection request 620 from client device 102 (e.g., 102E). A tuple is sent or broadcast over the secure tunnels established at steps 610A-610C. The tuple provided by primary appliance 108A includes an instance identifier (ID) of the appliance 108 providing the tuple. The tuple can also include server (e.g., public server 150) information such as a server ID, which is an identifier of the server that primary appliance 108A is trying to proxy. The tuple can also include an initialization (INIT) flag information to indicate that the appliance sending the tuple 108A is the primary instance for the server. The tuple can also include timeout information indicating the time until when the any other secondary appliances acquiring the tuple must wait for primary appliance 108A. In other words, the any other secondary appliances must wait within timeout expiry until primary appliance 108A makes a full SSL handshake and then provides the any other secondary appliances with session-related parameter. The any other secondary appliances 108B and 108C must wait for primary appliance 108A until timeout expiry, even when acquiring an SSL/TLS connection request to the same server.

At step 640, after primary appliance 108A provides a tuple for sending to other appliances, primary appliance 108A performs SSL/TLS full handshake procedure with the server (e.g., public server 150). During this communication, primary appliance 108A can acquire one or more session-related parameters through the SSL/TLS full handshake procedure. Primary appliance 108A can also store or cache the acquired one or more session-related parameters in its memory 222 or cache 240. SSL/TLS full handshake procedure includes procedure disclosed in IETF RFC 6101. SSL/TLS full handshake procedure also includes procedures for obtaining one or more session identifiers disclosed in IETF RFC 5246. SSL/TLS full handshake procedure also includes procedures for obtaining one or more session tickets disclosed in IETF RFC 5077. The one or more session-related parameters can include at least one session identifier. A session identifier is an arbitrary byte sequence chosen by a server (e.g., public server 150) to identify an active or resumable session state. The one or more session-related parameters can include at least one session ticket. A session ticket containing encrypted session state information is created by a TLS server (e.g., public server 150) and sent to a TLS client (e.g., appliance 108A). TLS client can present the session ticket to the TLS server to resume a session.

After primary appliance 108A acquires one or more session-related parameters from the server (e.g., the public server 150), primary appliance 108A can send at least one session-related parameter to one or more secondary appliances in a cluster. Primary appliance 108A can also broadcast at least one session-related parameter to all the secondary appliances in the cluster. As an example in FIG. 6, primary appliance 108A sends or broadcasts at least one session-related parameter to secondary appliance 108B at step 650A and secondary appliance 108C at step 650B. At least one session-related parameter can include the one or more session identifiers acquired from the public server 150. At least one session-related parameter can include the one or more session tickets acquired from the public server 150. Primary appliance 108A can add more parameters.

After acquiring at least one session-related parameter, secondary appliance 108B acquires an SSL/TLS connection request from client device 102A at step 660. Then, secondary appliance 108B identifies that the SSL/TLS connection request is destined for the same server (e.g., the public server 150). Secondary appliance 108B can reuse a session to the server (e.g., the public server 150) based on the acquired at least one session-related parameter at step 670 by forming a shorten SSL/TLS handshake in accordance with IETF RFC 5077. That is, secondary appliance 108B checks for a session cache and forms a shorten handshake, based on the acquired at least one session-related parameter, where keys can be computed locally because a certificate from the server (e.g., the public server 150) is not required.

Figure 7:
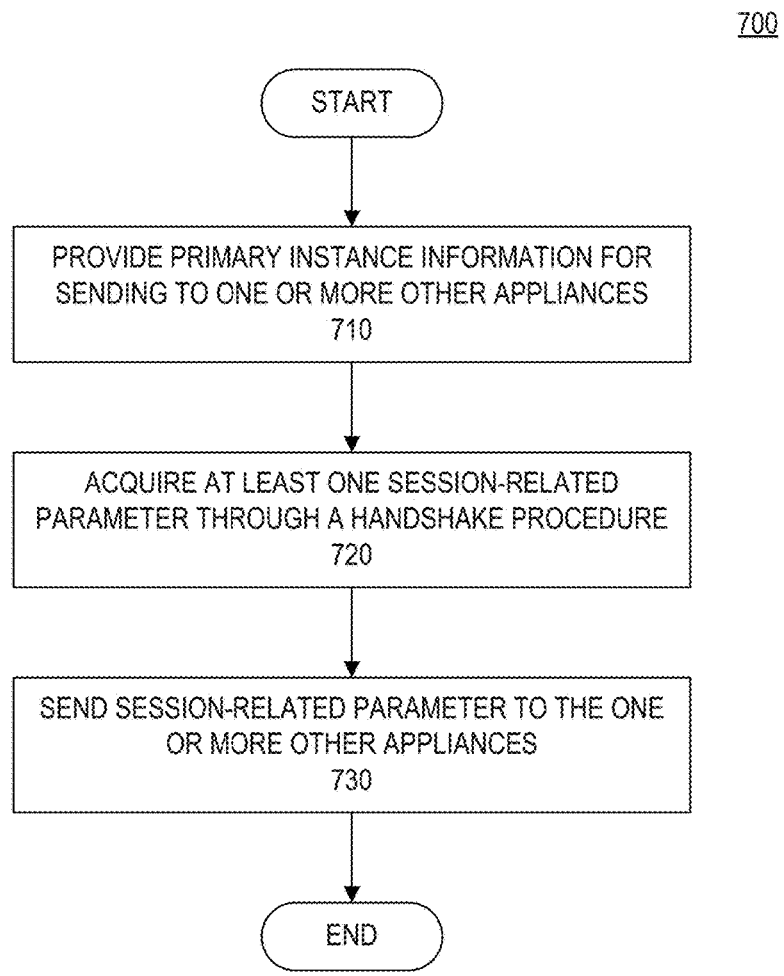
FIG. 7 is a flowchart representing an exemplary method of making efficient secure connections, consistent with embodiments of the present disclosure.

FIG. 7 is a flowchart representing an exemplary method 700 of making efficient secure connections, consistent with embodiments of the present disclosure. It will be readily appreciated that the illustrated procedure can be altered to delete steps or further include additional steps. The method 700 is described as being performed by primary appliance 108A with a primary instance.

At step 710, primary appliance 108A can send a message to one or more other appliances (e.g., one or more secondary appliances). Primary appliance 108A can broadcast a message to all other appliances in a cluster of appliances 108. The message includes a flag indicating that the appliance sending the message is acting as a primary instance for a specific server (e.g., public server 150). The message can include more information such as an instance ID of the appliance 108A sending the message, a server ID which is an identifier of the specific server that primary appliance 108A is trying to proxy, and timeout information indicating a time until when the one or more other appliances must wait for primary appliance 108A to provide the one or more other appliances with at least one session-related parameter.

At step 720, primary appliance 108A can acquire at least one session-related parameter through a handshake procedure for a secure layer with the server. The handshake procedure for a secure layer complies with the industry Internet standard, for example, in IETF RFC 6101, RFC 5246, and IETF RFC 5077. The one or more session-related parameters can include at least one session identifier, which is an arbitrary byte sequence chosen by a server to identify an active or resumable session state. The one or more session-related parameters can include at least one session ticket. A session ticket containing encrypted session state information is created by the server (e.g., public server 150) and is sent to primary appliance 108A. Then, primary appliance 108A can present the session ticket to the server to resume a session.

After receiving the one or more session-related parameters from the server, primary appliance 108A can send at least one session-related parameter to the one or more other appliances at step 730. Primary appliance 108A can broadcast at least one session-related parameter to all other appliances in the cluster of appliances 108. At least one session-related parameter can include the one or more session identifiers acquired from the server. At least one session-related parameter can include the one or more session tickets acquired from the server. Primary appliance 108A can include additional parameters.

Figure 8:
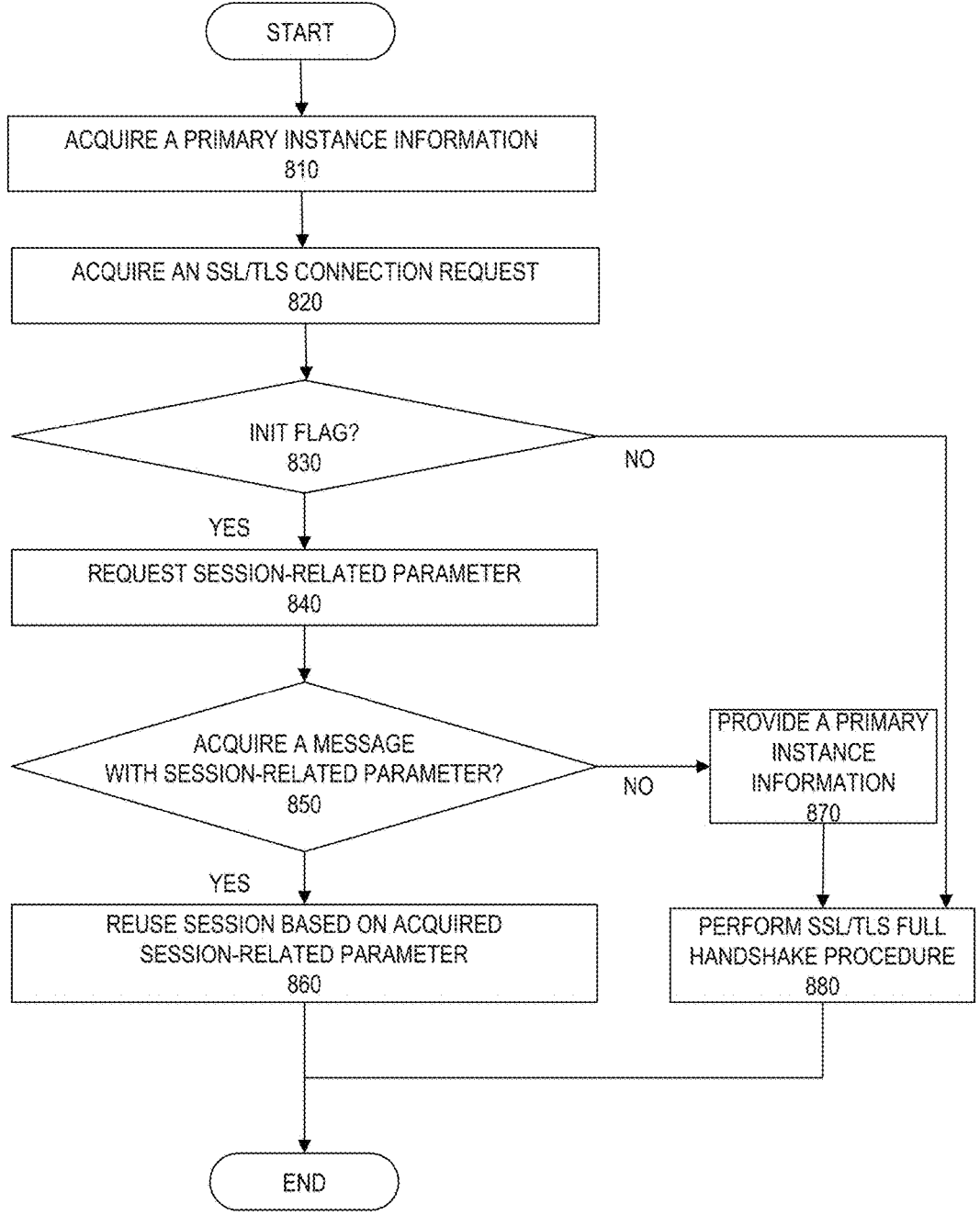
FIG. 8 is a flowchart representing an exemplary method of making efficient secure connections, consistent with embodiments of the present disclosure.

Referring now to FIG. 8, a flowchart representing an exemplary method 800 of making efficient secure connections, consistent with embodiments of the present disclosure. It will be readily appreciated that the illustrated procedure can be altered to delete steps or further include additional steps. The method 800 is described as being performed by a secondary appliance (e.g., appliance 108B or appliance 108C). Moreover, it is appreciated that the secondary appliance has been messaged by primary appliance 108A.

At step 810, secondary appliance 108B acquires a tuple from primary appliance 108A. The tuple acquired from primary appliance 108A contains information including an instance ID of the appliance 108A sending the tuple. The tuple can include a server ID indicating a server ID that primary appliance 108A is trying to proxy. The tuple can also include an INIT flag information to indicate that the appliance 108A is the primary instance for the server. The tuple also includes timeout information indicating a time until when secondary appliance 108B receiving the tuple waits for primary appliance 108A. In other words, secondary appliance 108B waits within timeout expiry until primary appliance 108A makes a full SSL handshake and then provides secondary appliance 108B with session-related parameter. Secondary appliance 108B waits for primary appliance 108A until timeout expiry, even when acquiring an SSL/TLS connection request to the same server. Secondary appliance 108B can store or cache the acquired tuple in its memory or cache.

At step 820, secondary appliance 108B acquires an SSL/TLS connection request from a client device. The SSL/TLS connection request includes server information including server identifier, and server IP address in order to get an SSL/TLS connection to the server. Secondary appliance 108B checks for which server the SSL/TLS connection request is destined based on the server information.

At step 830, secondary appliance 108B checks its memory to determine whether there is a tuple acquired from a primary appliance. If finding a tuple, secondary appliance 108B, using the comparison, determines whether there is an INIT flag indicating that a primary appliance is acting as a primary instance for the same server that the acquired SSL/TLS connection request is destined for, which is the same server destined in the SSL/TLS connection request. Upon determining that there is an INIT flag indicating that a primary appliance is acting as a primary instance for the same server, secondary appliance 108B determines whether it is within a timeout period specified in the tuple.

Upon determining that there is an INIT flag indicating a valid primary instance for the target server, secondary appliance 108B sends a message requesting session information to primary appliance 108A at step 840. It is considered to be a valid primary instance for the server when there is a primary instance for the server within timeout expiry whose timeout value is specified in the tuple.

When primary appliance 108A acquires the message requesting session information from secondary appliance 108B and has session information, primary appliance 108A responds back with a response message. The response message can include instance ID of the appliance 108A sending the response message. The response message can also include server information, such as a server ID identifying the server that primary appliance 108A is trying to proxy. The response message can also include at least one session-related parameter. At least one session-related parameter can include session-identifier information. In scenarios involving session-identifier information being reused for one or more sessions, at least one session-related parameter can include session identifier, session identifier length, chosen ciphersuite, chosen compression, start time, max fragment length, the master key, and other related flags and details. At least one session-related parameter can include session-ticket information. In scenarios involving session-ticket information being reused for one or more sessions, at least one session-related parameter can includes session ticket, ticket length, and ticket lifetime. The response message can further include a done flag indicating that all session details are sent to secondary appliance 108B and can be cached by secondary appliance 108B.

On the other hand, when primary appliance 108A receives the message requesting session information from secondary appliance 108B but does not have session information, primary appliance 108A responds back with a response message indicating that it does not have the session information.

After receiving a response message from primary appliance 108A, secondary appliance 108B determines whether the response message contains at least one session-related parameter at step 850. At least one session-related parameter may be session identifier information or session ticket information. If determining that the response message contains at least one session-related parameter, secondary appliance 108B reuses one or more sessions to the server based on the acquired at least one session-related parameter at step 860.

If, however, secondary appliance 108B determines that the response message does not contain session-related parameter, secondary appliance 108B provides a tuple for sending to primary appliance 108A at step 870. In some embodiments, the tuple can also be provided to any other secondary appliance (e.g., 108C). The tuple includes an instance ID of the appliance 108B sending the tuple. The tuple can also include server information such as a server ID identifying the server that secondary appliance 108B is trying to proxy. The tuple can also include an INIT flag information to indicate that secondary appliance 108B becomes the primary instance for the server. The tuple can also include timeout information indicating the time until when the any other appliances receiving the tuple must wait for the appliance 108B. In other words, the any other appliances must wait within timeout expiry until primary appliance 108A makes a full SSL handshake and then provides session-related parameter. The any other secondary appliances 108B and 108C must wait for primary appliance 108A until timeout expiry, even when acquiring an SSL/TLS connection request to the same server. Steps 860 and 870 can switch the appliance 108B's secondary role to a primary role. Thus, the appliance 108B becomes a primary appliance for the server within a timeout period specified in the tuple performs the methods described in FIG. 7. It is appreciated that the step 870 is similar to the step 710 in FIG. 7.

After providing the tuple at step 870, the appliance 108B performs an SSL/TLS full handshake procedure at step 880. The appliance 108B can further perform receiving at least one session-related parameter from the server as shown at step 720 and sending at least one session-related parameter to the one or more other appliances as described at step 730 in FIG. 7.

Figure 9:
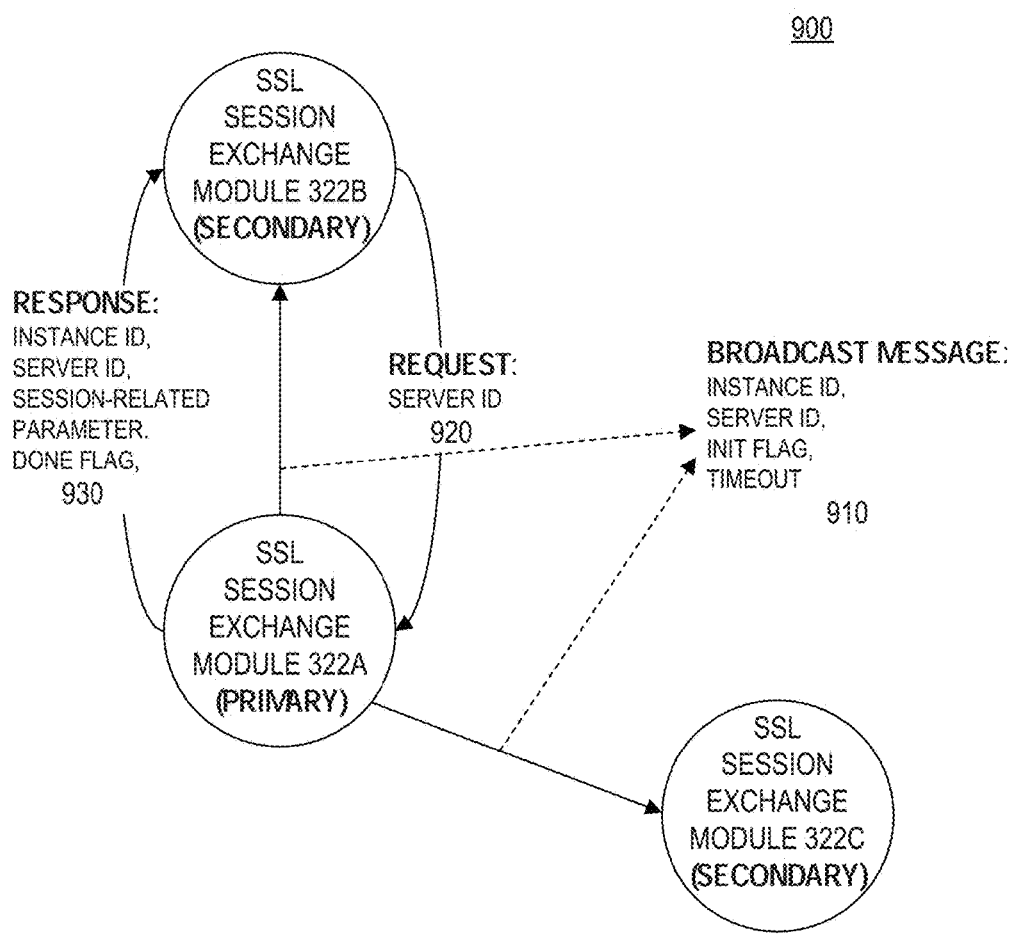
FIG. 9 is a block diagram of an exemplary method between SSL session exchange modules, consistent with embodiments of the present disclosure.

FIG. 9 is a block diagram of an exemplary method 900 between SSL session exchange modules, consistent with embodiments of the present disclosure. An SSL session exchange module 322 can be implemented in appliance 108 or 108'. On every reboot of appliance 108 or 108', an SSL session exchange module 322 in appliance 108 or 108' performs a secure tunnel establishment to each of the other appliances in a cluster of appliances, as disclosed at steps 610A-610C. This can be established by either configuring a symmetrical key in each of the appliances in the cluster or by installing trusted certificates and its private keys. Any information or messages including tuples and at least one session related parameter exchanged between appliances are transmitted over the secure tunnel. Establishing a secure tunnel between appliances is typically a one-time activity and can happen every time appliance 108 or 108' boots up.

As an example, FIG. 9 shows an SSL session exchange module 322A, which can be embedded in primary appliance 108A, acting as primary to a particular server (hereinafter a primary SSL session exchange module 322A). SSL session exchange modules 322B and 322C, which can be embedded in secondary appliances 108B and 108C respectively, both acting as secondary (hereinafter secondary SSL session exchange modules 322B and 322C).

At step 910, primary SSL session exchange module 322A provides a tuple for sending to one or more secondary SSL session exchange modules in a cluster. Primary SSL session exchange module 322A can also provide a tuple for sending to some or all of the secondary appliances in the cluster. As an example in FIG. 9, primary SSL session exchange module 322A provides a tuple for sending to the secondary SSL session exchange modules 322B and 322C. In general, providing a tuple to one or more of secondary SSL session exchange modules can be performed before or after receiving a new SSL/TLS connection request from client device 102. A tuple is sent or broadcast over a secure tunnels established between appliances at steps 610A-610C as shown in FIG. 6. The tuple provided by primary SSL session exchange module 322A includes an instance ID of SSL session exchange module 322A or primary appliance 108A providing the tuple. The tuple can also include server information such as a server ID which is an identifier of the server that primary SSL session exchange module 322A or primary appliance 108A is trying to proxy. The tuple can also include an INIT flag information to indicate that primary SSL session exchange module 322A or primary appliance 108A is the primary instance for the server. The tuple can also include timeout information indicating a time until when the any other SSL session exchange modules receiving the tuple wait for primary SSL session exchange module 322A. In other words, the any other SSL session exchange modules wait within timeout expiry until primary SSL session exchange module 322A makes a full SSL handshake and then provides the any other SSL session exchange modules with session-related parameter. The any other SSL session exchange modules waits for primary appliance 108A until timeout expiry, even when acquiring an SSL/TLS connection request to the same server. The any other SSL session exchange modules can store or cache the acquired tuple in its memory or cache.

At step 920, secondary SSL session exchange module 322B sends primary SSL session exchange module 322A a request message including a server ID that secondary SSL session exchange module 322B wants to have an SSL/TLS connection. Sending the request message can be triggered by an SSL/TLS session connection request acquired by secondary SSL session exchange module 322B from client device 102.

When primary SSL session exchange module 322A receives the request message and can acquire at least one session-related parameter to the server whose name matches to the received server ID in the request message, primary SSL session exchange module 322A sends secondary SSL session exchange module 322B a response message at step 930. The response message includes instance ID of primary SSL session exchange module 322A or primary appliance 108A which sends the response message. The response message can also have server information including as a server ID which is an identifier of the server that primary SSL session exchange module 322A is trying to proxy. The response message can also include at least one session-related parameter. At least one session-related parameter can include session identifier information. In case of using session identifier information to reuse one or more sessions, at least one session-related parameter includes session identifier, session identifier length, chosen ciphersuite, chosen compression, start time, max fragment length, the master key, and other related flags and details. At least one session-related parameter can include session ticket information. In case of using session ticket information to reuse one or more sessions, at least one session-related parameter includes session ticket, ticket length, and ticket lifetime. The response message can further include a done flag indicating that all the session details are sent to secondary SSL session exchange module 322B and can be cached by secondary SSL session exchange module 322B in its memory.

Figure 10A:
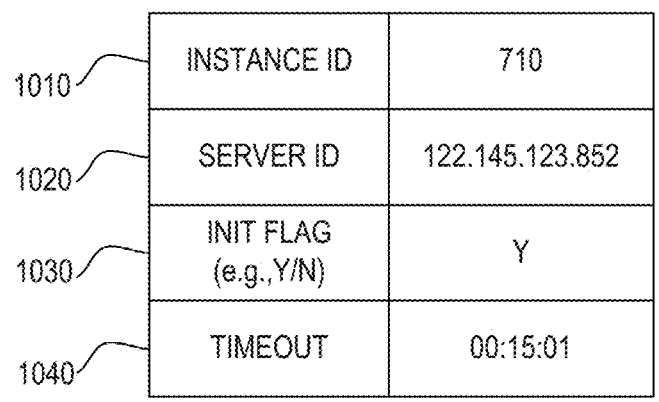

FIG. 10A is exemplary information sent by an appliance, consistent with embodiments of the present disclosure. FIG. 10A illustrates exemplary information included in a tuple provided by a primary appliance, for example at step 630A-630B in FIG. 6, at step 710 in FIG. 7, at step 870 in FIG. 8, or at step 910 in FIG. 9. Although the tuple includes instance identifier (ID), server ID, INIT flag, and timeout information in FIG. 10A, it is appreciated to add or omit other information in the tuple. Instance ID 1010 identifies appliance 108 or an SSL session exchange module 322 sending the tuple and can be in any form of digits, alphanumeric characters, symbols, or in any combination thereof. Server ID 1020 is a name of a server that the appliance 108 or the SSL session exchange module 322 sending the tuple is trying to proxy and can be identified as an IP address of the server, and in any form of digits, alphanumeric characters, symbols, uniform resource locator, uniform resource name, or in any combination thereof. INIT flag 1030 is to indicate that the appliance sending the tuple is a primary instance for the server, and can be in any form of yes/no, on/off, or boolean 0/1. Timeout 1040 is to indicate time until when any other secondary appliances or secondary SSL session exchange modules receiving the tuple must wait for the primary appliance or the primary SSL session exchange module to provide at least one session-related parameter, and can be in absolute time, relative time, or length of time period.

FIG. 10B reflects additional exemplary information sent by an appliance, consistent with embodiments of the present disclosure. FIG. 10B illustrates exemplary information included in a tuple provided by a primary appliance, for example at step 860 in FIG. 8, or at step 930 in FIG. 9. Although the tuple includes instance ID, server ID, at least one session-related parameter and done flag information in FIG. 10B, it is appreciated to add or omit other information in the tuple. Instance ID 1010 is to identify appliance 108 or an SSL session exchange module 322 providing the tuple and can be in any form of digits, alphanumeric characters, symbols, or in any combination thereof. Server ID 1020 is a name of a server that the appliance 108 or the SSL session exchange module 322 providing the tuple is trying to proxy and can be identified as an IP address of the server, and be in any form of digits, alphanumeric characters, symbols, uniform resource locator, uniform resource name, or in any combination thereof. At least one session-related parameter 1050 can include session identifier information 1051 and/or session ticket information 1052. Session identifier information 1051 can assist with reusing one or more sessions and can include at least one session-related parameter such as a session identifier, session identifier length, chosen ciphersuite, chosen compression, start time, max fragment length, the master key, and other related flags and details. Session ticket information 1052 can assist with reusing one or more sessions and can include at least one session-related parameter such as a session ticket, ticket length, and ticket lifetime.

Done flag 1060 is to indicate that all the session details are sent and can be cached, and can be in any form of yes/no, on/off, or boolean 0/1.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An appliance of a cluster of appliances, the appliance comprising:
   one or more network interfaces configured to facilitate a first secure session between a client device and the appliance and a second secure session between the appliance and a server; and
   a secure session exchange module configured to:
   provide a message that includes an initialization indicator for broadcasting to one or more other appliances of the cluster of appliances when a new connection request is received from the client device, the message indicating that the appliance is acting as a primary instance for the server among the one or more other appliances and is responsible for performing a full handshake procedure with the server, and
   acquire at least one session-related parameter through the full handshake procedure for a secure layer with the server, wherein a network interface of the one or more network interfaces is configured to send the at least one session-related parameter to one or more other appliances for use by the one or more other appliances to perform a shortened handshake by reusing the at least one session-related parameter.

2. The appliance of claim 1, wherein the message further includes at least one of an instance identifier, a server identifier, and session time out information.

3. The appliance of claim 2, wherein the session time out information provides an indication when the one or more other appliances should wait for the appliance to provide the one or more the other appliances with the at least one session-related parameter.

4. The appliance of claim 1, wherein the appliance acts as primary until when a session time out value expires.

5. The appliance of claim 1, wherein the handshake procedure for the secure layer with the server is performed based on a Secure Socket Layer/Transport Layer Security (SSL/TLS) full handshake protocol.

6. The appliance of claim 1, wherein the at least one session-related parameter includes at least one session identifier or at least one session ticket, wherein the session-related parameter includes at least one of: session identifier, session identifier length, chosen ciphersuite, chosen compression, start time, max fragment length, master key, and flag; and wherein the session-related parameter includes at least one of: session ticket, ticket length, and ticket lifetime.

7. The appliance of claim 1, the secure session exchange module is further configured to acquire a secure connection request.

8. The appliance of claim 1, the secure session exchange module is further configured to establish a secure tunnel with any one of the one or more other appliances.

9. The appliance of claim 8, wherein the sending of the message to one or more other appliances is over the secure tunnel.

10. The appliance of claim 1, the secure session exchange module is further configured to acquire a request message including a server identifier from at least one of the other appliances.

11. The appliance of claim 10, wherein the acquisition of the request message including the server identifier is configured to trigger the appliance to send the at least one session-related parameter to the at least one of the other appliances.

12. A method of optimizing network traffic, comprising:
   providing a message that includes an initialization indicator for broadcasting to one or more other appliances of a cluster of appliances when a new connection request is received from a client device, the message indicating that the appliance is acting as a primary instance for a server among the one or more other appliances and is responsible for performing a full handshake procedure with the server;
   acquiring at least one session-related parameter through the full handshake procedure for a secure layer with the server; and
   sending the at least one session-related parameter to one or more other appliances for use by the one or more other appliances to perform a shortened handshake by reusing the at least one session-related parameter.

13. The method of claim 12, wherein the message further includes at least one of an instance identifier, a server identifier, and session time out information.

14. The method of claim 13, wherein the session time out information provides an indication when the one or more other appliances should wait for the appliance to provide the one or more the other appliances with the at least one session-related parameter.

15. The method of claim 12, wherein the appliance acts as primary until when a session time out value expires.

16. The method of claim 12, wherein the handshake procedure for a secure layer to the server is performed based on a Secure Socket Layer/Transport Layer Security (SSL/TLS) handshake protocol.

17. The method of claim 12, wherein the at least one session-related parameter includes at least one session identifier or at least one session ticket, wherein the session-related parameter includes at least one of: session identifier, session identifier length, chosen ciphersuite, chosen compression, start time, max fragment length, master key, and flag; and wherein the session-related parameter includes at least one of: session ticket, ticket length, and ticket lifetime.

18. The method of claim 12, the method further comprising acquiring a secure connection request.

19. The method of claim 12, the method further comprising establishing a secure tunnel with any one of the one or more other appliances.

20. The method of claim 19, wherein the sending of the message to the one or more other appliances is over the secure tunnel.

21. The method of claim 19, the method further comprising acquiring a request message including a server identifier from at least one of the other appliances.

22. The method of claim 21, wherein the acquisition of the request message including the server identifier is configured to trigger the appliance to send the at least one at least one session-related parameter to the at least one of the other appliances.

23. A non-transitory computer readable storage medium that stores a set of instructions that are executable by at least one processor of an appliance to cause the appliance to perform a method for optimizing network traffic, the method comprising:

providing a message that includes an initialization indicator for broadcasting to one or more other appliances of a cluster of appliances when a new connection request is received from a client device, the message indicating that the appliance is acting as a primary instance for a server among the one or more other appliances and is responsible for performing a full handshake procedure with the server;

acquiring at least one session-related parameter through the full handshake procedure for a secure layer with the server; and sending the at least one session-related parameter to one or more other appliances for use by the one or more other appliances to perform a shortened handshake by reusing the at least one session-related parameter.

\* \* \* \* \*